UNITED STATES PATENT OFFICE 2,285,563

SUBSTITUTED DIHYDROXY-DIPHENYLS

Edgar C. Britton and John E. Livak, Midland, Mich., assignors to The Dow Chemical Company, Midland, Mich., a corporation of Michigan No Drawing. Original application June 23, 1939, Serial No. 280,846. Divided and this application May 2, 1941, Serial No. 391,510

2 Claims. (Cl. 260—620)

This invention relates to certain new derivatives of 4.4'-dihydroxy-diphenyl and in particular concerns substituted dihydroxy-diphenyls having the general formula

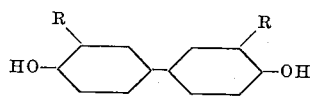

wherein R represents an alkyl group containing at least 4 carbon atoms, a cycloalkyl group, or an aralkyl group. Examples of such compounds are 3.3'-di-n-butyl-4.4'-dihydroxy-diphenyl, 3.3'-di-isobutyl-4.4'-dihydroxy-diphenyl, 3.3'-di-tertiaryamyl-4.4'-dihydroxy-diphenyl, 3.3'-di-n-octyl-4.4'-dihydroxy-diphenyl, 3.3'-di-benzyl-4.4'-dihydroxy-diphenyl, 3.3'-di-cyclohexyl-4.4'-dihydroxy-diphenyl, etc.

The substituted dihydroxy-diphenyls having the above general formula are usually obtained in the form of white crystalline solids which are substantially insoluble in water but are soluble in common organic solvents, e. g. acetone, petroleum ether, carbon tetrachloride, benzene, etc. They are useful as intermediates in the preparation of dyes and dye intermediates, plasticizers, wetting agents, pharmaceuticals, toxicants, etc.

The alkyl- and cycloalkyl-substituted dihydroxy-diphenyls of the present class may be prepared by forming the para-iodo derivative of the corresponding ortho-alkyl or cycloalkyl phenol and thereafter condensing two molecules of such iodo derivative to form the desired dihydroxy-diphenyl compound. Since the free hydroxyl group of the phenol is reactive under the conditions employed for these reactions, it is necessary to protect the hydroxyl group, for example, by etherification, during the iodination and condensation reactions and thereafter regenerate the free phenol. For example, in preparing 3.3'-di-hexyl-4.4'-dihydroxy-diphenyl, o-hexyl-phenol is first reacted with an alkylating agent, e. g. dimethyl sulphate, ethyl chloride, etc., in the known manner to form an o-hexyl-phenyl ether, e. g. o-hexyl-anisole, o-hexyl-phenetole, etc., which compound is then reacted with iodine in the presence of mercuric oxide or other strong oxidizing agent to form the corresponding p-iodo-o-hexyl-phenyl ether. To molecules of this latter compound are then condensed, employing copper powder or other suitable condensing agent, to form a di-ether of 3.3'-di-hexyl-4.4'-dihydroxy-diphenyl from which product the desired 3.3'-di-hexyl-4.4'-dihydroxy-diphenyl may be obtained by treatment with hydrogen iodide.

The reactions involved in such mode of procedure may be represented as follows:

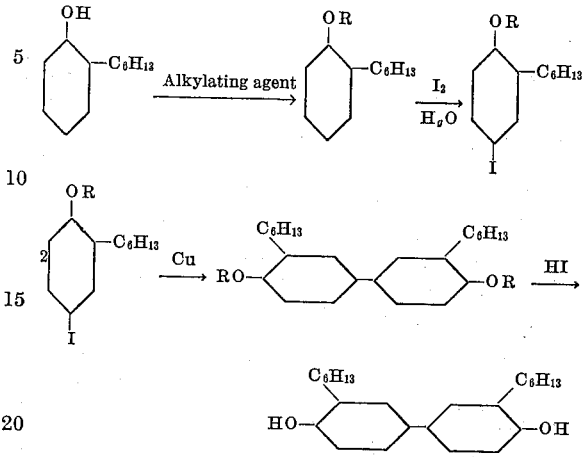

wherein R represents a lower alkyl group. All of these reactions are of a well-known type and the most suitable conditions for effecting them will be apparent to those skilled in the art.

The alkyl-substituted dihydroxy-diphenyls may also be prepared by the hydrogenation of the corresponding alkenyl-substituted dihydroxy-diphenyls, certain of which compounds are described and claimed in our U. S. Patent No. 2,229,010 issued January 14, 1941. Thus, 3.3'-di-isobutyl-4.4'-di-hydroxy-diphenyl may be prepared by hydrogenating 3.3'-di-(2-methylallyl)-4.4'-dihydroxy-diphenyl, 3.3'-di-n-hexyl-4.4'-di-hydroxy-diphenyl by hydrogenating 3.3'-di-(3-propylallyl)-4.4'-dihydroxy-diphenyl, etc. The hydrogenation reaction is preferably carried out by the direct addition of gaseous hydrogen under pressure to a solution of the alkenyl-dihydroxy-diphenyl compound in an inert solvent in the presence of a hydrogenation catalyst, such as nickel, platinum oxide, etc. The reaction takes place quite readily at ordinary temperatures, e. g. 20°–30° C., but, if desired, higher temperatures may be employed. Upon completion of the reaction, the catalyst is filtered off and the hydrogenated product recovered directly from the reaction mixture and purified by crystallization from a suitable solvent.

The aralkyl-dihydroxy-diphenyls of the present class may be prepared by the condensation of a p-iodo-o-aralkyl-phenyl ether, as hereinbefore described, although they are more conveniently prepared by the direct aralkylation of 4.4'-dihydroxy-diphenyl. In carrying out such reaction, the 4.4'-dihydroxy-diphenyl is first reacted with an alkali to form an alkali-metal salt thereof and the latter compound is heated with an aralkyl halide, e. g. benzyl bromide, alpha-chloroethyl benzene, etc., at reflux temperature until the reaction is complete. In the absence of excess alkali, the desired product is formed directly and is recovered from the reaction mixture and purified by recrystallization from a suitable organic solvent. Should an excess of alkali be present, the product is initially obtained in the form of an alkali-metal salt from which the free hydroxy compound may be recovered by treatment with a dilute mineral acid.

The following examples will illustrate several ways in which the principle of our invention has been applied, but are not to be construed as limiting the same.

*Example 1*

256 grams of iodine was added in 30 gram portions over a period of 20 minutes to a mixture of 190 grams of o-cyclohexyl-anisole (prepared by the methylation of o-cyclohexyl-phenol), 108 grams of mercuric oxide, and 550 grams of ethyl alcohol maintained at a temperature of about 25°–55° C. The mixture was then heated at reflux temperature for 4 hours after which time it was cooled and filtered, and the alcohol was removed by distillation. The distillation residue was washed with a dilute aqueous sodium bisulfite solution to destroy unreacted iodine, and the washed product was extracted with carbon tetrachloride. The carbon tetrachloride extract was then fractionally distilled whereby there was obtained p-iodo-o-cyclohexyl-anisole, an oily liquid distilling at approximately 165°–175° C. under 5 millimeters pressure. A mixture of 110 grams of this product and 75 grams of copper powder was heated at a temperature of about 260°–300° C. for ½ hour after which time the mixture was cooled and extracted with benzene. The benzene was evaporated from the extract and the crystalline residue was recrystallized from glacial acetic acid whereby 3.3'-di-cyclohexyl-4.4'-di-methoxy-diphenyl was obtained in the form of glistening white plates melting at 174.5°–175.5° C. 28.4 grams of the 3.3'-di-cyclohexyl-4.4'-di-methoxy-diphenyl thus obtained was then dissolved in approximately 100 grams of phenol by warming to 120° C., and 72.7 grams of hydrogen iodide in the form of a 57 per cent aqueous solution was added gradually with stirring. The mixture was then heated at reflux temperature (125° C.) for 2 hours after which time it was cooled and poured into 500 cc. of water, whereby the 3.3'-di-cyclohexyl-4.4'-dihydroxy-diphenyl product was precipitated as a white crystalline solid. After recrystallization from glacial acetic acid, this compound had a melting point of 209°–213° C.

*Example 2*

11.3 grams of 3.3'-di-(2-methylallyl)-4.4'-dihydroxy-diphenyl (M. P.=97°–97.5° C.), prepared by the rearrangement of 4.4'-di-(2-methylallyloxy)-diphenyl, was dissolved in 60 grams of ethyl alcohol, and, after the addition of 0.1 gram of platinum oxide, was treated with gaseous hydrogen under pressure in a Burgess-Parr hydrogenation apparatus. The theoretical amount of hydrogen (0.08 mole) was absorbed in about 3 minutes. Upon conclusion of the hydrogenation, the alcohol solution was filtered to remove the platinum oxide catalyst and the filtrate was evaporated to dryness on a steam bath. The residue was recrystallized twice from a benzene-petroleum ether mixture whereby 3.3'-di-isobutyl-4.4'-dihydroxy-diphenyl was obtained in the form of a white crystalline solid melting at 136°–138° C.

*Example 3*

A suspension of 53.2 grams of the di-sodium salt of 4.4'-dihydroxy-diphenyl in 345 grams of toluene was heated to reflux temperature to drive off water of crystallization after which time 50.6 grams of benzyl chloride was added gradually with stirring at a temperature of about 25° C. The mixture was then heated at reflux temperature (112° C.) for 8 hours, cooled, washed with petroleum ether and water, and filtered. The precipitate, consisting of crude 3.3'-dibenzyl-4.4'-dihydroxy-diphenyl, was digested with dilute aqueous sodium hydroxide, filtered, and the alkaline filtrate was acidified with dilute aqueous hydrochloric acid, whereby the 3.3'-dibenzyl-4.4'-dihydroxy-diphenyl product was precipitated as a white crystalline solid. After two recrystallizations from benzene, the compound had a melting point of approximately 151°–158° C.

Other substituted dihydroxy-diphenyl compounds of the present class which may be prepared as herein described include 3.3'-di-tertiarybutyl-4.4'-dihydroxy-diphenyl, 3.3'-di-n-heptyl-4.4'-dihydroxy-diphenyl, 3.3'-di-isoamyl-4.4'-dihydroxy-diphenyl, 3.3'-di-tertiaryoctyl-4.4'-dihydroxy-diphenyl, 3.3'-di-beta-phenylethyl-4.4'-dihydroxy-diphenyl, 3.3'-di-cyclopentyl-4.4'-dihydroxy-diphenyl, 3.3'-di-gamma-phenylpropyl-4.4'-dihydroxy-diphenyl, 3.3'-di-lauryl-4.4'-dihydroxy-diphenyl, etc.

This application is a division of our copending application Serial No. 280,846, filed June 23, 1939 now Patent #2,260,739, issued Oct. 28, 1941.

We claim:

1. A substituted dihydroxy-diphenyl compound having the general formula

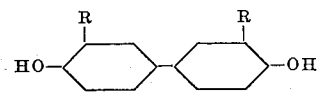

wherein R represents a cycloalkyl group.

2. 3.3'-di-cyclohexyl-4.4'-dihydroxy-diphenyl, a white crystalline solid having a melting point of approximately 209°–213° C. and the formula

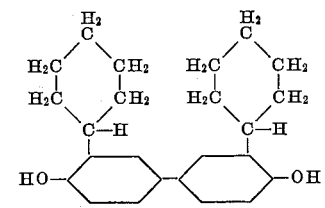

EDGAR C. BRITTON.
JOHN E. LIVAK.